US010975967B2

(12) United States Patent
Owens, Jr. et al.

(10) Patent No.: US 10,975,967 B2
(45) Date of Patent: Apr. 13, 2021

(54) RADIALLY AND AXIALLY SELF-ALIGNING SPLIT SEAL RING

(71) Applicant: Flowserve Management Company, Irving, TX (US)

(72) Inventors: Glenn Robert Owens, Jr., Kalamazoo, MI (US); Mark David Volz, Scotts, MI (US)

(73) Assignee: Flowserve Management Company, Irving, TX (US)

( * ) Notice: Subject to any disclaimer, the term of this patent is extended or adjusted under 35 U.S.C. 154(b) by 104 days.

(21) Appl. No.: 16/325,026

(22) PCT Filed: Sep. 12, 2017

(86) PCT No.: PCT/US2017/051123
§ 371 (c)(1),
(2) Date: Feb. 12, 2019

(87) PCT Pub. No.: WO2018/052887
PCT Pub. Date: Mar. 22, 2018

(65) Prior Publication Data
US 2019/0186636 A1 Jun. 20, 2019

Related U.S. Application Data

(60) Provisional application No. 62/395,576, filed on Sep. 16, 2016.

(51) Int. Cl.
*F16J 15/34* (2006.01)
*F04D 29/12* (2006.01)

(52) U.S. Cl.
CPC .......... *F16J 15/3488* (2013.01); *F04D 29/12* (2013.01)

(58) Field of Classification Search
CPC ........ F16J 15/3488; F16J 15/34; F16J 15/346; F04D 29/12; F04D 29/08; F04D 29/10; F04D 29/122; F04D 29/126
(Continued)

(56) References Cited

U.S. PATENT DOCUMENTS 1,485,128 A * 2/1924 Small .......................... F16J 9/14
277/469
1,489,464 A * 4/1924 Small .......................... F16J 9/06
277/445

(Continued)

FOREIGN PATENT DOCUMENTS

| EP | 0330762 A2 | 9/1989 |
|---|---|---|
| EP | 0658173 A1 | 6/1995 |

(Continued)

OTHER PUBLICATIONS

Foreign Office Action dated Jun. 9, 2020 for Canadian Appl. No. 3048264, 3 Pages.

(Continued)

*Primary Examiner* — Nathan Cumar
(74) *Attorney, Agent, or Firm* — Maine Cernota & Rardin

(57) ABSTRACT

A split seal ring having end faces that self-align in both the axial and radial directions is prepared by forming an opposing first pair of angled grooves extending from an inner edge partway across the seal ring inner diameter, and a second pair of angled grooves extending from the inner edge partway across the seal ring rear surface. In embodiments, corresponding grooves meet to form V-shapes. Additional grooves can extend from the outer edge partway across the inner diameter. Corresponding grooves extending from the outer and inner edges on the inner diameter can terminate at locations that are offset radially and/or angularly. By applying an outward force, the seal ring is split at the groove locations into split ring sections having mating end faces.

(Continued)

The resulting end face geometry is sufficiently complex to cause both radial and axial realignment as the seal ring halves are mated together.

13 Claims, 3 Drawing Sheets

(58) Field of Classification Search
USPC .......................................................... 277/358
See application file for complete search history.

(56) References Cited

U.S. PATENT DOCUMENTS

| | | |
|---|---|---|
| 3,101,200 A | 8/1963 | Tracy |
| 3,116,066 A | 12/1963 | Koppius |
| 4,533,149 A | 8/1985 | Vater et al. |
| 4,580,793 A * | 4/1986 | Bronson .............. F16J 15/3488 277/547 |
| 4,659,092 A | 4/1987 | Wallace et al. |
| 5,067,733 A * | 11/1991 | Nagai .................. F16J 15/3488 277/370 |
| 5,556,110 A | 9/1996 | Marsi et al. |
| 5,913,521 A * | 6/1999 | Sangren .............. F16J 15/3488 277/370 |
| 6,311,983 B1 | 11/2001 | Burcham |
| 8,894,292 B2 * | 11/2014 | Yamakawa .............. F16C 9/02 384/570 |
| 2002/0101038 A1 * | 8/2002 | Budrow ................ F04D 29/124 277/370 |
| 2005/0265644 A1 * | 12/2005 | Waseda .................. F16C 33/60 384/499 |
| 2008/0001053 A1 * | 1/2008 | Sandy ..................... F16L 23/08 248/544 |
| 2008/0246178 A1 * | 10/2008 | Hashimoto ................ F16J 9/14 264/157 |
| 2010/0230962 A1 * | 9/2010 | Bongiorno .............. F16L 23/24 285/363 |
| 2011/0064350 A1 | 3/2011 | Yamakawa et al. |
| 2011/0079961 A1 | 4/2011 | Hoffmann et al. |
| 2012/0112421 A1 * | 5/2012 | Sato ..................... F16J 15/3272 277/631 |
| 2012/0139186 A1 | 6/2012 | Suefuji |
| 2014/0159315 A1 | 6/2014 | Cid |
| 2014/0159316 A1 * | 6/2014 | Cid ..................... F16J 15/3488 277/375 |
| 2015/0354583 A1 | 12/2015 | Postuchow |
| 2019/0186636 A1 | 6/2019 | Owens, Jr. et al. |

FOREIGN PATENT DOCUMENTS

| | | |
|---|---|---|
| EP | 3513102 A1 | 7/2019 |
| EP | 3568620 A1 | 11/2019 |
| JP | 4002751 B2 | 11/2007 |
| JP | 4063610 B2 | 3/2008 |
| JP | 4576621 B2 | 11/2010 |
| WO | 2015061132 A1 | 4/2015 |
| WO | 2018052887 A1 | 2/2018 |
| WO | 2018132451 A1 | 7/2018 |

OTHER PUBLICATIONS

Extended European Search Report for Application No. 17851391.7 dated Jan. 8, 2020, 8 pages.
International Preliminary Report on Patentability for Appl No. PCT/US2018/013131 dated Jul. 16, 2019, 9 Pages.
PCT Search Report and Written Opinion for Appl No. PCT/US2018/013131 dated Apr. 18, 2018, 13 pages.
Canadian Office Action for Appl No. 3048264 dated Nov. 13, 2019, 3 pages.
Extended European Search Report for Application No. 18739227.9 dated Jan. 10, 2020, 6 pages.
International Preliminary Report on Patentability for Appl No. PCT/US2017/051123 dated Mar. 19, 2019, 10 pages.
International Search Report & Written Opinion for Appl No. PCT/US2017/051123 dated Dec. 22, 2017, 13 pages.
Canadian Office Action for Appl No. 3048264 dated Dec. 13, 2019, 3 pages.
Canadian Office Action for Appl No. 3032446 dated Dec. 7, 2019, 3 pages.
Foreign Office Action for European Patent Appl. No. 18739227.9, dated Jul. 2, 2020, 6 Pages.
Office Action dated Apr. 14, 2020 for Canadian Patent Appl. No. 3,048,264, 2 pages.
Notice of Allowance for U.S. Appl. No. 16/474,607, dated Jan. 15, 2021, 56 Pages.

* cited by examiner

RADIALLY AND AXIALLY SELF-ALIGNING SPLIT SEAL RING

RELATED APPLICATIONS

This application is a national phase application of PCT application PCT/US17/51123, filed Sep. 12, 2017, which claims the benefit of U.S. Provisional Application No. 62/395,576, filed Sep. 16, 2016. Each of these applications is herein incorporated by reference in its entirety for all purposes.

FIELD OF THE INVENTION

The invention relates to mechanical shaft seals, and more particularly, to split end face mechanical shaft seals.

BACKGROUND OF THE INVENTION

Mechanical shaft seals are used on a wide variety of machines, including pumps and the like, having rotating shafts that pass through housings. Typically, the mechanical seal is disposed in surrounding relationship to the shaft and creates a seal between the shaft and the housing by bringing two parallel, annular seal faces into sliding physical contact, where one of the seal faces is part of a stator seal ring fixed to the housing and the other seal face is part of a rotor seal ring that is rotationally fixed to the shaft. Normally, at least one of the seal rings (usually the stator ring) is axially slidable, and a positive pressure is maintained between the seal faces by a spring or other mechanism that presses the slidable ring toward the other ring. The seal rings are generally made from wear resistant materials such as silicon carbide. Nevertheless, the seal faces wear over time and require replacement.

Since installation or replacement of mechanical seals employing one-piece ring members is an extremely time consuming and complex operation, numerous assemblies with split ring members have been developed to facilitate installation and repair. Typically, the split ring members are formed by splitting one-piece ring members. In particular, each one-piece ring member is split by forming axial grooves at opposing locations on the inner annual surface (also referred to as the "inner diameter") of the ring member, whereby the grooves extend from the outer face (outer edge of the inner diameter) to the inner face (inner edge of the inner diameter) of the ring member. Once the grooves have been formed, pressure is applied in the radially outward direction at two locations separated by approximately ninety degrees from the grooves, whereby the pressure is sufficient to fracture and split the ring member along the grooves. Due to the symmetry of the ring, orientation of the grooves, and natural grain configuration of the ring material, the exposed end faces of the resultant seal ring segments are relatively flat and smooth. Any surface irregularities are usually nominal, and are solely the result of the grain structure of the seal ring material.

While split ring seal assemblies are recognized to possess highly desirable advantages, an important challenge in split ring seals is the radial and axial alignment of the split seal ring halves with each other. Typically, the seal is engineered to maintain a gap between the sealing faces that is less than $10^{-5}$ inches wide, so any misalignment of the split seal ring halves will significantly increase process emissions and seal face wear.

One approach that has been suggested for addressing this alignment problem is to form a pair of radial groves on at least one face of the seal ring, whereby the radial grooves are either curved, V-shaped, or otherwise non-linear. The resulting end faces of the split rings are shaped so as to be self-aligning in the radial direction. However, they are not self-aligning in the axial direction. A similar approach can produce end faces that are self-aligning in the axial direction, but not in the radial direction.

What is needed, therefore, is an improved split seal ring design that improves alignment of the ring halves in both the axial and radial directions.

SUMMARY OF THE INVENTION

An improved split seal ring design and method of manufacture thereof are disclosed that provides split rings with end faces that are self-aligning in both the axial and radial directions, thereby improving the alignment of the ring halves.

According to the present invention, a first pair of angled grooves or "stress risers" are etched or otherwise formed so as to extend from a rear edge of the inner diameter and to partially but not fully span the seal ring inner diameter, while a second pair of angled grooves extend from the inner rear edge across the bottom end surface (seating face) of the seal ring. In embodiments, corresponding angled grooves formed in the inner diameter and bottom end face meet at the adjoining rear edge of the inner diameter, thereby forming a V-shape.

Embodiments further include at least one additional pair of grooves extending from the front edge of the inner diameter partially but not fully across the inner diameter. In some of these embodiments, grooves extending from the front and rear edges of the inner diameter correspond with each other, in that they are angularly aligned, or at least proximal even if angularly offset from each other. In certain of these embodiments, an offset or gap is maintained between corresponding grooves such that they do not extend far enough to meet each other on the inner diameter. In various embodiments, corresponding grooves extending from the front and rear edges terminate at locations in the inner diameter that are not axially aligned, due to an angular offset between the groove locations, a difference in length between the grooves, and/or a difference in direction between the grooves.

Accordingly to the present invention, none of the grooves extends entirely across a surface of the sealing ring. This is a critical feature, in that it allows the geometry of the break to change direction beyond the grooves and to extend in the region beyond the grooves both axially and radially according to the natural grain structure of the ring material. The resulting split end geometry is sufficiently complex and three-dimensional that both radial and axial realignment naturally occurs as the seal ring halves are brought together.

A first general aspect of the present disclosure is a split seal ring suitable for incorporation in a split mechanical shaft seal. The split seal ring comprising a pair of ring sections having end faces that can be mated so as to form a complete seal ring, the end faces having shapes that are complex in three dimensions and cannot be described as projections of a two dimensional curve, the mated end faces being thereby self-aligning in both an axial and a radial direction relative to the seal ring.

In embodiments, each of the ring sections comprises substantially one half of the split seal ring.

In any of the above embodiments, a portion of each end face can be approximately planar. In some of these embodiments, the planar portions of the end faces lie in a plane that passes through a central axis of the split seal ring.

A second general aspect of the present disclosure is a method of forming a split seal ring suitable for incorporation in a split mechanical seal. The method includes providing a one-piece seal ring having an inner diameter surface that extends between coaxial front and rear circular edges of equal radius, and a flat, annular rear face that extends between the inner circular edge and an outer diameter edge, forming a first pair of angled grooves in the inner diameter surface, whereby the first grooves extend from the inner edge but are not perpendicular to the inner edge and do not extend to the outer edge, forming a second pair of angled grooves in the rear face, whereby the second grooves extend from the inner edge but are not perpendicular to the inner edge and do not extend to the outer diameter edge, and applying radially outward forces to the seal ring until the seal ring is split at the locations of the pairs of grooves so as to form two ring segments, each of which terminates in a pair of end faces, the end faces having shapes that are complex in three dimensions and cannot be described as projections of a two dimensional curve, the end faces, when mated to re-form the complete seal ring, being thereby self-aligning in both an axial and a radial direction of the seal ring.

In embodiments, the pairs of grooves are formed at opposing locations on the seal ring, so that each of the ring segments comprises substantially one half of the split seal ring.

In any of the above embodiments, a portion of each end face can be approximately planar. And in some of these embodiments the planar portions of the end faces lie in a plane that passes through a central axis of the split seal ring.

In any of the above embodiments, wherein the grooves can be formed by etching.

In any of the above embodiments, corresponding first and second grooves can meet at the inner edge.

Any of the above embodiments can further comprise forming a third pair of grooves in the inner diameter surface that extend from the outer edge but are not perpendicular to the outer edge and do not extend to the inner edge. In some of these embodiments, corresponding grooves of the first and third pairs are insufficiently long to reach each other on the inner diameter surface, so that they are separated from each other by an axial gap. And in any of these embodiments corresponding grooves of the first and third pairs can terminate at locations on the inner diameter surface that are offset angularly from each other.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an improved split seal ring design and method of manufacture thereof that provide split seal rings with end faces that are self-aligning in both the axial and radial directions, thereby improving the alignment of the seal ring halves.

Figure 1:
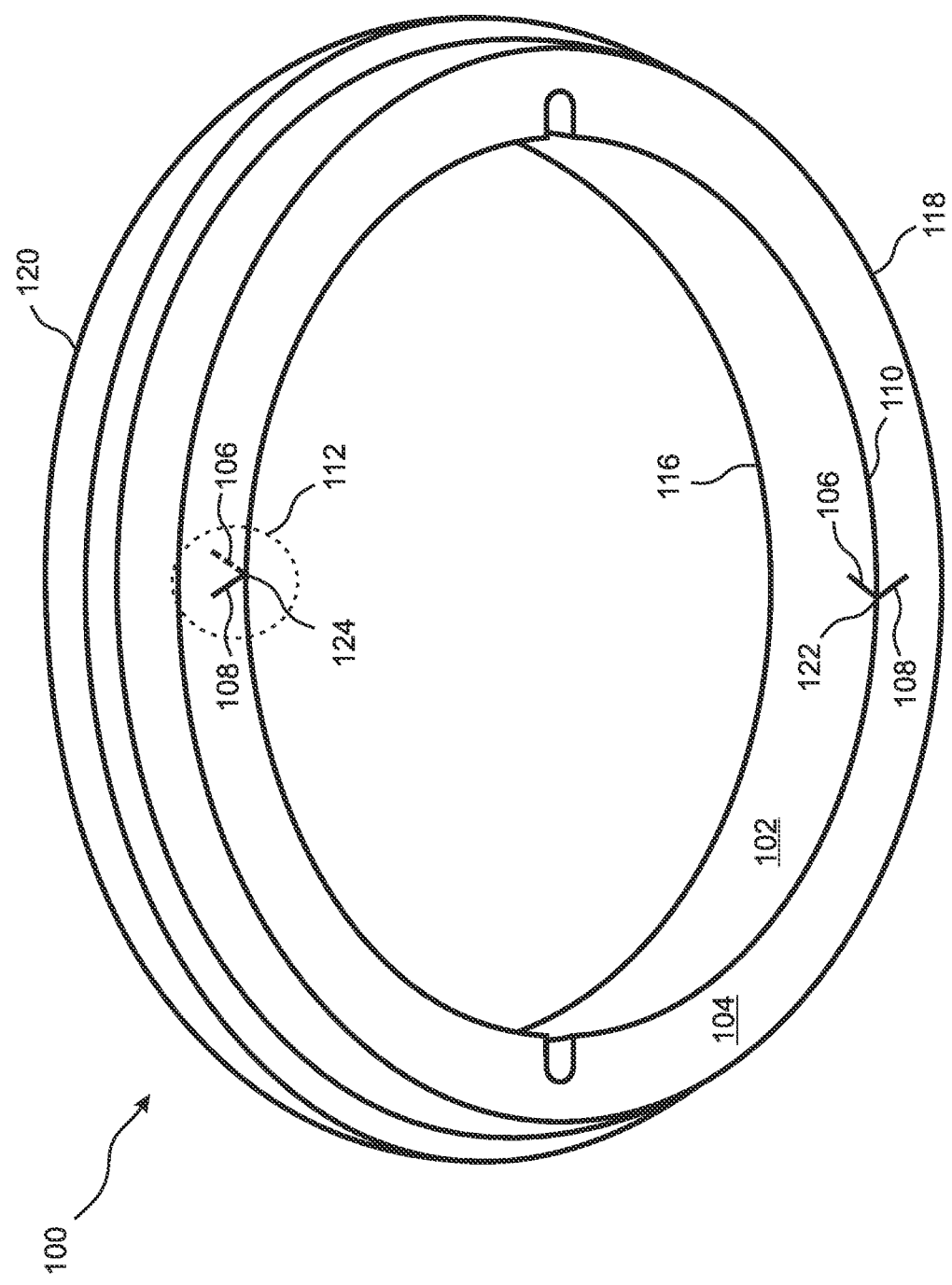
FIG. 1 is a perspective view of a one-piece seal ring prepared for splitting by grooves that form V-shapes centered on a rear edge of the inner diameter.

With reference to FIG. 1, a split seal ring 100 according to the present invention is initially formed as a one-piece single seal ring 100 in the shape of an annulus. The seal ring 100 has a flat inner diameter surface 102 that extends between a rear inner circular edge 110 and a front inner circular edge 116 and is configured to surround a rotating shaft (not shown). The sealing ring 100 further comprises a flat, annular front sealing face (312 in FIG. 3) that is configured to form a seal when positioned against the sealing face of a matching seal ring. A complete seal assembly includes a "rotor" seal ring that is rotationally fixed to the shaft and a "stator" seal ring that is fixed to a surrounding housing. The radially outward facing surfaces of the seal rings may have complex shapes that differ from one another, according to the surrounding structures that support them. However, for each of the seal rings 100 the "front sealing face is flat and extends from the front inner circular edge 116 to a front outer edge 120 of the front sealing face, and the rear face 104, also sometimes referred to as the "bottom" or "seating" face or surface, is typically flat, and extends from the rear inner circular edge 110 of the inner diameter surface 102 to a rear outer edge 118 of the rear face. The present invention applies equally to the rotor and stator seal rings, and can be described mainly in terms of the inner diameter surface 102 and rear face 104.

According to the present invention, an angled groove or "stress riser" 106 is etched or otherwise formed so as to extend from the rear inner circular edge 110 partway across the seal ring inner diameter surface 102, while a second angled groove 108 is formed so as to extend from the rear inner circular edge 110 partway across the rear face 104 of the seal ring 100. In the embodiment shown in FIG. 1, the corresponding angled grooves 106, 108 meet at a first location 122 along the inner circular edge 110, forming a V-shape 106, 108. In similar embodiments, the angled grooves 106, 108 extend from locations along the inner circular edge 110 that are proximal to each other, but not necessarily identical. A second V-shaped pair 112 of stress risers is formed at a second location 124 which in the embodiment of FIG. 1 is directly opposite to the first pair 106, 108. In FIG. 1, the second pair of stress risers 112 is identical to the first pair 106, 108. In similar embodiments, the two pairs of stress risers have differing configurations.

Figure 2:
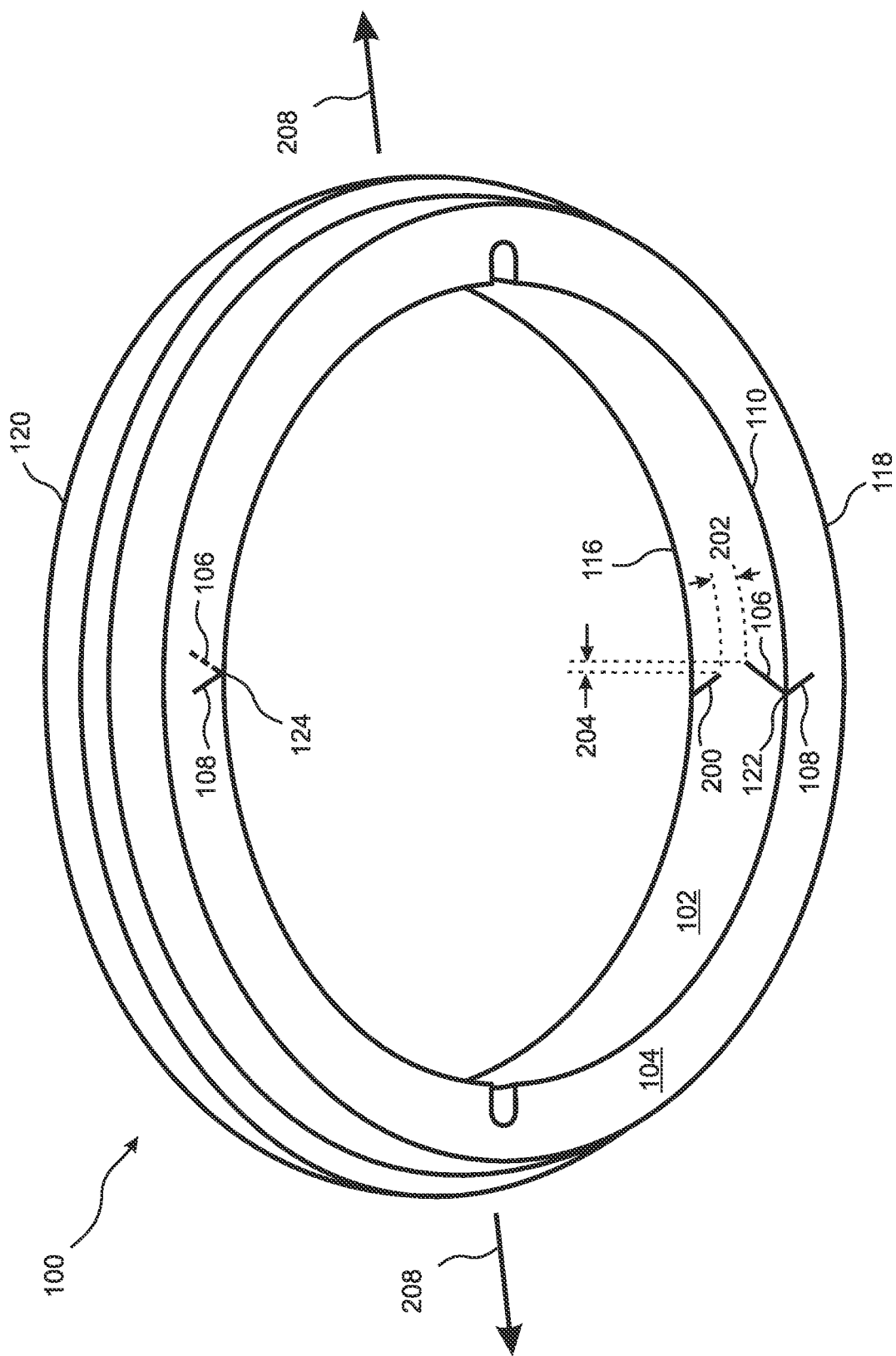
FIG. 2 is a perspective view of a one-piece seal ring similar to FIG. 1, but including additional grooves extending partially across the inner diameter from a front edge of the inner diameter.

With reference to FIG. 2, in other embodiments, one or more pairs of additional grooves 200 are formed that extend from the front edge 116 of the inner diameter 102 partway across the inner diameter. In the embodiment of FIG. 2, corresponding grooves 106, 200 formed on the inner diameter 102 do not extend sufficiently far to meet each other, so that a radial gap 202 is maintained between them.

It should also be noted that the corresponding grooves 106, 200 differ in length in FIG. 2, such that although they extend from points on the edges 110, 116 that are axially aligned, they terminate at locations on the inner diameter 102 that are separated by an angular offset 204. In similar embodiments, an angular offset 204 is provided wholly or partly due to an angular difference between the locations where the corresponding grooves 106, 200 meet the edges, and/or a difference in the angle that each groove makes with the axial direction. In embodiments, this feature of an angular offset 204 significantly enhances the consistency of the break that is formed when the seal 100 is pulled apart into two halves.

Once the grooves 106, 108, 200 are formed, outwardly directed pressure 208 is applied to the seal ring 100 at locations that are approximately ninety degrees separated from the grooves 106, 108, 200, whereby the pressure is sufficient to fracture and split the ring member 100 at the locations of the grooves 106, 108, 200.

Figure 3:
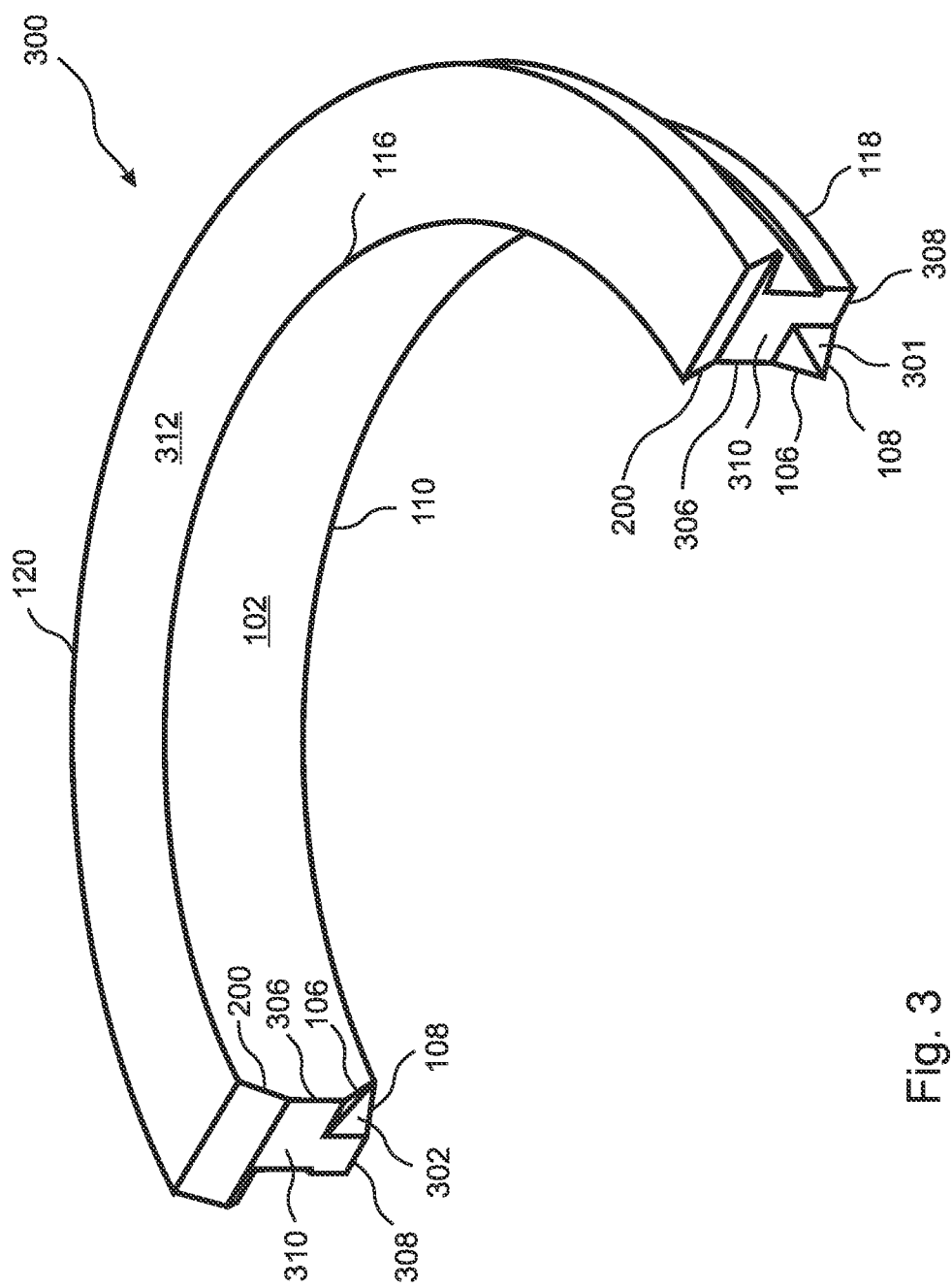
FIG. 3 is a perspective view of one-half of the seal ring of FIG. 2 after splitting.

FIG. 3 illustrates one half 300 of the seal ring 100 of FIG. 1 after being split. The end faces 310, including complex, three dimensional shapes 301, 302 that can be seen in the figure. For each of the end faces 310, the break can be seen to have followed the grooves 106, 108, 200, and then to have changed direction in the regions 306, 308 beyond the grooves 106, 108, 200 resulting in the complex geometry 301, 302 as shown.

According to the present invention, none of the grooves 106, 108, 200 extends entirely across a face 102, 104 of the sealing ring 100. This is a critical feature, in that it allows the geometry of the break to change direction beyond the grooves 106, 108, 200 and to extend both axially and radially according to the natural grain structure of the ring material in the region that is not controlled by the grooves.

According to the embodiment of FIG. 2, in the regions where the end faces are not governed by the grooves 106, 108, 200, the grain of the material is assumed to naturally form flat surfaces 310 that are contained within a plane that also contains the central axis of the seal ring (not indicated). In various other embodiments, these regions take on different shapes and extend in different directions, depending on the properties of the natural grain. In all embodiments, however, the resulting split end geometry is sufficiently complex that both radial and axial realignment naturally occurs as the seal ring halves are brought together. In particular, the resulting shapes of the end faces are three-dimensionally complex, in that they cannot be described as mere projections of a two-dimensional shape.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One of ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

We claim:

1. A split seal ring suitable for incorporation in a split end face mechanical shaft seal, the split seal ring comprising a pair of ring sections having end faces that can be mated so as to form a complete seal ring, each of the ring sections being an annulus sector of the split seal ring, the split ring seal being split in planes that are parallel to a central axis of the seal ring, the end faces having complementary complex shapes that extend in three dimensions, the complementary complex shape of each end face is unique, the mated end faces being in mutual contact over entire surfaces of the end faces when mated, the mated end faces being self-aligning in both an axial and a radial direction relative to the split seal ring, such that when the end faces of the pair of ring sections are mated and the ring sections are pressed radially inward toward each other, the end faces with complementary complex shapes that extend in three dimensions naturally align the end faces both axially and radially.

2. The split seal ring of claim 1, wherein each of the ring sections comprises substantially one half of the split seal ring.

3. The split seal ring of claim 1, wherein a portion of each end face is approximately planar.

4. The split seal ring of claim 3, wherein the planar portions of the end faces lie in a plane that passes through a central axis of the split seal ring.

5. A method of forming a split seal ring suitable for incorporation in a split mechanical seal, the method comprising:

providing a single, undivided seal ring having an inner diameter surface that extends between coaxial front and rear inner circular edges of equal radius, a flat, annular rear face that extends between the rear inner circular edge and a rear outer diameter edge, and a flat annular front face that extends between the front inner circular edge and a front outer diameter edge;

forming a first pair of angled grooves in the inner diameter surface, whereby the first angled grooves extend from first and second locations about the rear inner circular edge but are not perpendicular to the rear inner circular edge and do not extend to the front inner circular edge;

forming a second pair of angled grooves in the rear face, whereby the second angled grooves extend from the rear inner circular edge but are not perpendicular to the rear inner circular edge and do not extend to the rear outer diameter edge, the second pair of angled grooves extending from third and fourth locations on the rear inner circular edge that are proximal respectively to the first and second locations; and applying radially outward forces to the single, undivided seal ring until the seal ring is split proximal to the first and second locations along planes that are parallel to the central axis of the seal ring, thereby forming a split sea ring according to claim 1.

6. The method of claim 5, wherein the first and second locations are at substantially opposing locations about the rear inner circular edge, so that each of the ring segments comprises substantially one half of the split seal ring.

7. The method of claim 5, wherein a portion of each end face is approximately planar.

8. The method of claim 7, wherein the planar portions of the end faces lie in a plane that passes through a central axis of the split seal ring.

9. The method of claim 5, wherein the grooves are formed by etching.

10. The method of claim 5, wherein corresponding first and second grooves meet at the rear inner circular edge.

11. The method of claim 5, further comprising forming a third pair of grooves in the inner diameter surface that extend from fifth and sixth locations about the front inner circular edge but are not perpendicular to the front inner circular edge and do not extend to the rear inner circular edge, the fifth and sixth locations being substantially axially aligned respectively with the first and second locations.

12. The method of claim 11, wherein corresponding grooves of the first and third pairs of grooves are separated from each other by an axial gap.

13. The method of claim 11, wherein corresponding grooves of the first and third pairs of grooves terminate at locations on the inner diameter surface that are offset angularly from each other.

\* \* \* \* \*

UNITED STATES PATENT AND TRADEMARK OFFICE
CERTIFICATE OF CORRECTION

PATENT NO. : 10,975,967 B2
APPLICATION NO. : 16/325026
DATED : April 13, 2021
INVENTOR(S) : Owens, Jr. et al.

Page 1 of 1

It is certified that error appears in the above-identified patent and that said Letters Patent is hereby corrected as shown below:

In the Claims

Column 6, Line 58: 'sea ring' should be 'seal ring'

Signed and Sealed this
Ninth Day of August, 2022

Katherine Kelly Vidal
*Director of the United States Patent and Trademark Office*